United States Patent
Dailey et al.

(10) Patent No.: US 7,237,797 B2
(45) Date of Patent: Jul. 3, 2007

(54) INSTRUMENT PANEL HAVING MODULAR AIRBAG DOOR ASSEMBLY

(75) Inventors: Daniel Phillip Dailey, West Bloomfield, MI (US); Matthew Thomas Kemp, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 251 days.

(21) Appl. No.: 10/692,572

(22) Filed: Oct. 24, 2003

(65) Prior Publication Data

US 2005/0087963 A1 Apr. 28, 2005

(51) Int. Cl.
*B60R 21/20* (2006.01)

(52) U.S. Cl. .................................. 280/728.3

(58) Field of Classification Search ............... 280/732, 280/728.3, 728.2
See application file for complete search history.

(56) References Cited

U.S. PATENT DOCUMENTS

| | | | |
|---|---|---|---|
| 5,527,063 A * | 6/1996 | Garner et al. ............ | 280/728.2 |
| 5,544,912 A | 8/1996 | Sommer | |
| 5,611,564 A * | 3/1997 | Bauer ...................... | 280/728.3 |
| 5,772,240 A * | 6/1998 | Vavalidis ................... | 280/732 |
| 5,810,388 A * | 9/1998 | Berardi et al. ............ | 280/728.3 |
| 5,845,931 A | 12/1998 | Nagy et al. | |
| 6,065,771 A * | 5/2000 | Kawakubo et al. ....... | 280/728.3 |
| 6,082,760 A * | 7/2000 | Ukai et al. ................ | 280/728.3 |
| 6,092,835 A * | 7/2000 | Thakore et al. .......... | 280/728.3 |
| 6,123,356 A | 9/2000 | Gray et al. | |
| 6,164,684 A * | 12/2000 | Lehman .................... | 280/728.2 |
| 6,375,878 B1 | 4/2002 | Gray et al. | |
| 6,402,189 B1 | 6/2002 | Gray et al. | |
| 6,457,739 B1 * | 10/2002 | Dailey et al. ............ | 280/728.3 |
| 6,581,959 B2 | 6/2003 | Muller | |
| 6,612,613 B1 * | 9/2003 | Hodges .................... | 280/728.3 |
| 6,644,685 B2 * | 11/2003 | Sun et al. ................. | 280/728.3 |
| 6,692,017 B2 * | 2/2004 | Taoka et al. ............. | 280/728.2 |
| 6,726,239 B1 * | 4/2004 | Teranishi et al. ......... | 280/728.3 |
| 6,742,804 B2 * | 6/2004 | Suzuki et al. ............ | 280/728.3 |
| 6,918,609 B1 * | 7/2005 | Friery et al. ............. | 280/728.1 |
| 2001/0040367 A1 | 11/2001 | Nakashima et al. | |
| 2003/0047916 A1 * | 3/2003 | Sun et al. ................. | 280/728.3 |
| 2004/0174000 A1 * | 9/2004 | Speelman et al. ....... | 280/728.3 |

* cited by examiner

*Primary Examiner*—Paul N. Dickson
*Assistant Examiner*—Barry Gooden, Jr.
(74) *Attorney, Agent, or Firm*—Brinks Hofer Gilson & Lione

(57) ABSTRACT

A modular airbag door assembly includes an airbag chute having a front side and a rear side and defines an opening extending therethrough. A door panel is pivotally mounted to the front side of the airbag chute and covers the opening therein. The airbag door assembly further includes a plurality of weld studs extending from the rear side of the airbag chute. The weld studs are adapted to allow the airbag door assembly to be mounted to a substrate of an instrument panel with the rear side of the airbag chute being positioned against a front side of the substrate.

11 Claims, 4 Drawing Sheets

INSTRUMENT PANEL HAVING MODULAR AIRBAG DOOR ASSEMBLY

TECHNICAL FIELD OF THE INVENTION

This invention is related to a foam-in-place instrument panel having a concealed and integrated passenger side airbag mounted therein. More specifically, the present invention relates to an instrument panel having a modular airbag door assembly mounted therein.

BACKGROUND OF THE INVENTION

Referring to FIG. 1, an example of previous foam-in-place automotive instrument panels having an integral passenger side airbag system is shown generally at 10. An airbag module 12 is attached to an airbag chute 14 which is attached to an inner surface 16 of a substrate 18. A door panel 20 is mounted to a front surface 22 of the substrate 18. Thus, the substrate 18 is sandwiched between the door panel 20 and the airbag chute 14.

Therefore, there is a need for an improved instrument panel assembly having a modular airbag door assembly wherein the door panel and the airbag chute are mounted to a front surface of the substrate, thereby eliminating the sandwiching of the substrate between the door panel and the airbag chute.

BRIEF SUMMARY OF THE INVENTION

In accordance with an aspect of the present invention a modular airbag door assembly includes an airbag chute having a front side and a rear side and an opening extending therethrough; a door panel pivotally mounted to the front side of the airbag chute and covering the opening therein; and a plurality of weld studs extending from the rear side of the airbag chute and being adapted to secure the modular airbag door assembly to the substrate of an instrument panel.

In another aspect of the present invention the modular airbag door assembly includes adhesive tape extending around peripheral edges of the door panel and the airbag chute to provide a seal therebetween, and a seal mounted to the back side of the airbag chute that is adapted to provide a sealed engagement between the airbag chute and a substrate to which the modular airbag door is to be mounted.

In a further aspect of the present invention, an instrument panel for an automobile includes a substrate having an inner surface, an outer surface, and an opening extending therethrough; a modular airbag door assembly mounted to the outer surface of the substrate; and an airbag device mounted to the modular airbag door assembly adjacent the inner surface of the substrate.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 2:
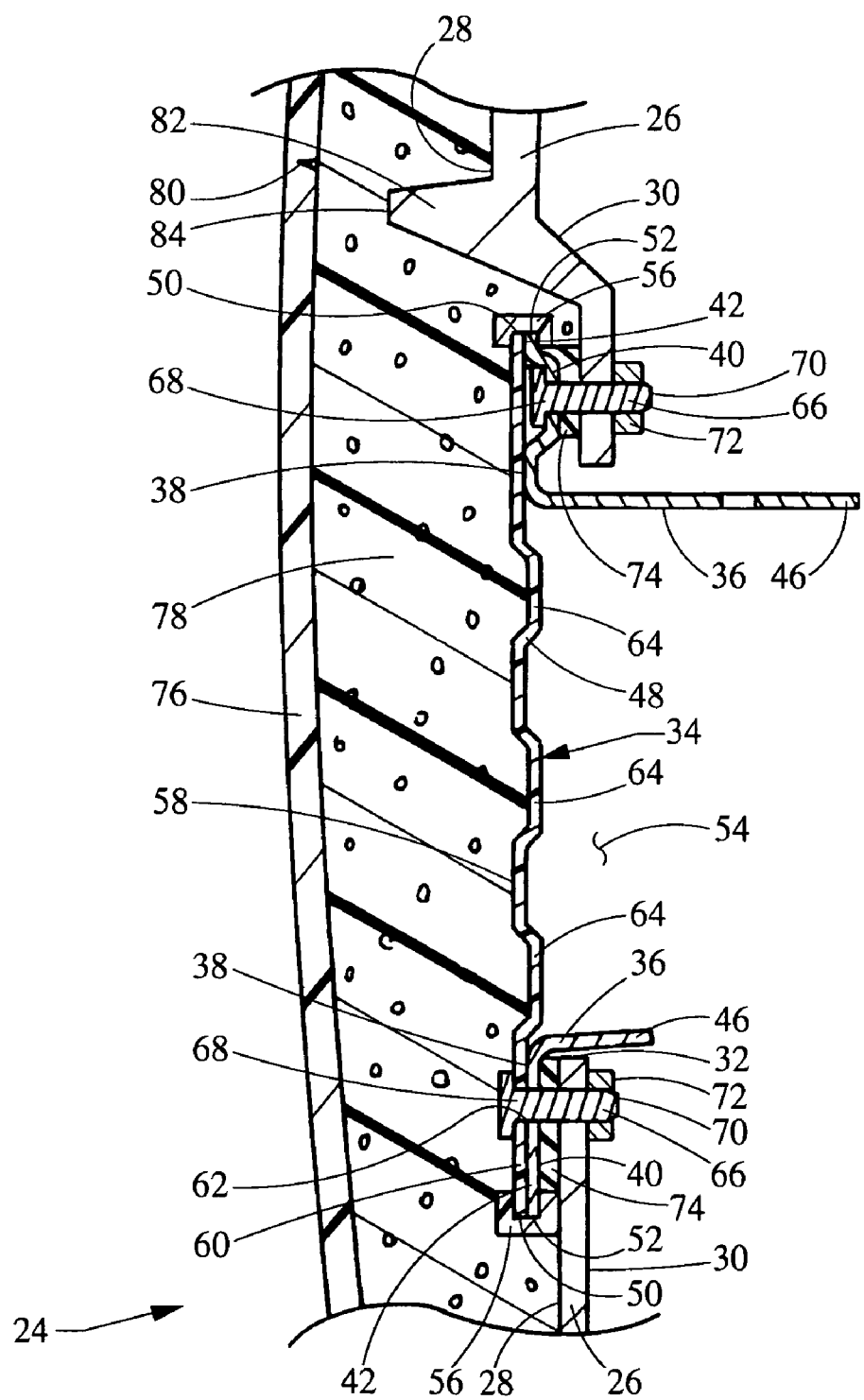
FIG. 2 is a sectional view of an instrument panel having a modular air bag door assembly of the present invention.
Figure 4:
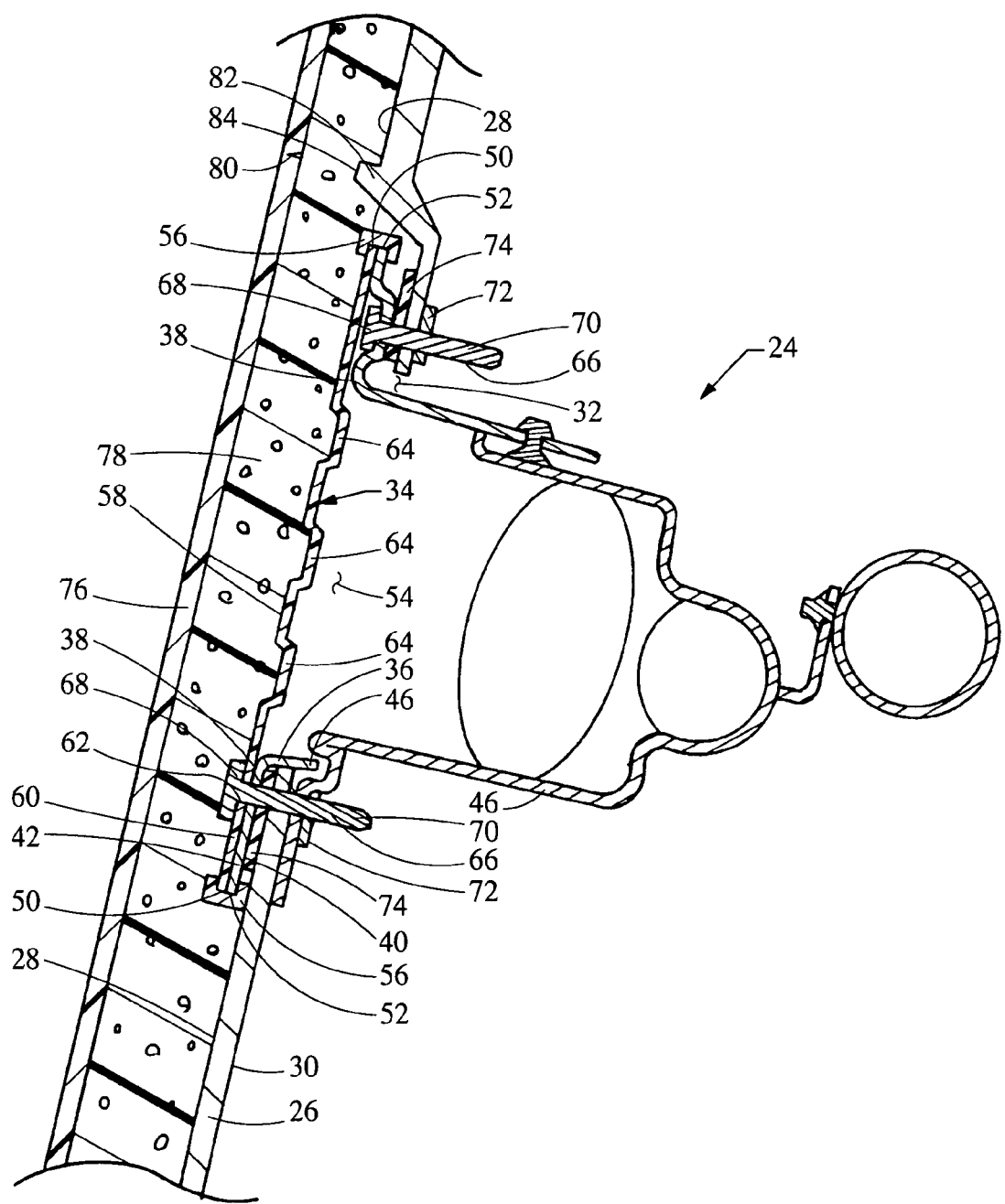
FIG. 4 is a sectional view of an instrument panel having a modular door panel assembly and an air bag module mounted thereon.
Figure 5:
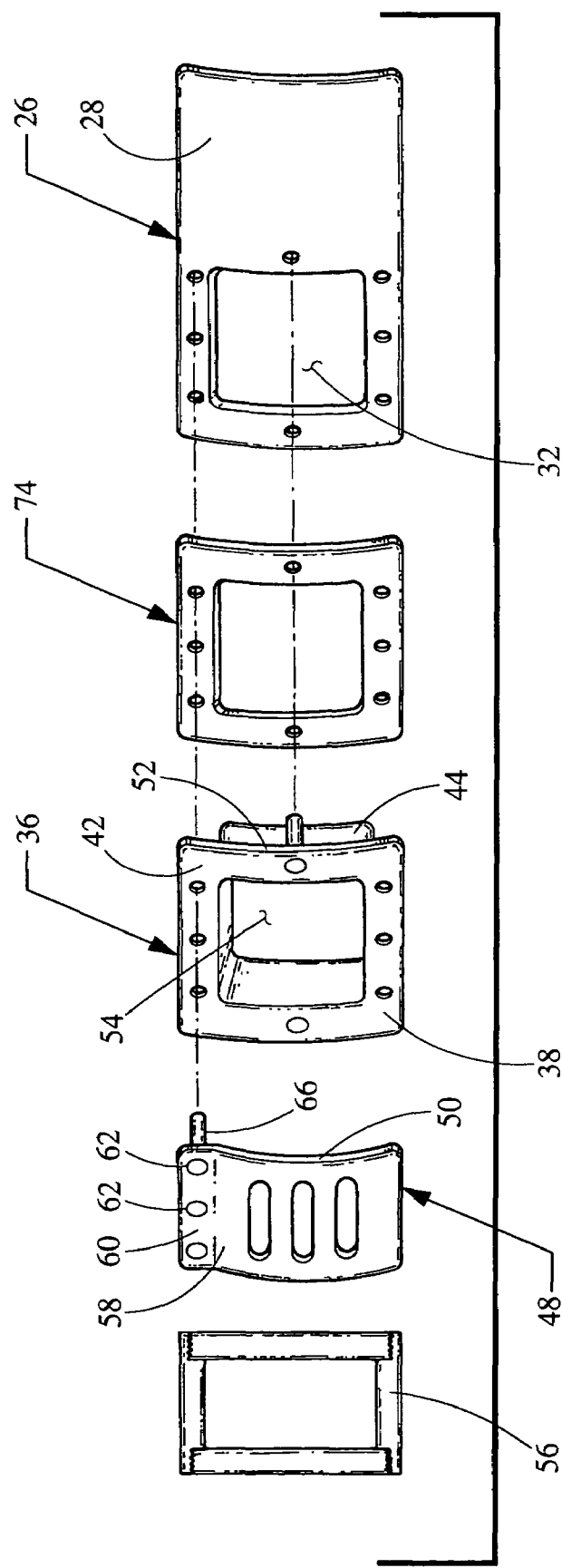
FIG. 5 is an exploded view of the modular air bag door assembly and substrate shown in FIG. 2.

Referring to FIG. 2, an instrument panel of the present invention is shown generally at 24. The instrument panel 24 includes a substrate 26 that forms the underlying structure for the instrument panel 24. The substrate 26 can be made from any suitable rigid material, however in the preferred embodiment, the substrate 26 is formed from plastic. The substrate 26 has an outer surface 28, that faces the interior of the vehicle, and an inner surface 30 that faces away from the interior of the vehicle. The substrate 26 further includes an opening 32 extending therethrough.

A modular airbag door assembly 34 is mounted to the outer surface 28 of the substrate 26. The modular airbag door assembly 34 includes an airbag chute 36 that has a front side 38, facing the interior of the vehicle, and a rear side 40, facing away from the interior of the vehicle. The airbag chute 36 includes a flange portion 42 and a chute portion 44. The flange portion 42 supports the airbag door assembly 34 onto the outer surface 28 of the substrate 26. The chute portion 44 of the airbag chute 36 extends through the opening 32 within the substrate 26. An airbag device 46 is mounted to the chute portion 44 of the airbag chute 36 adjacent the inner surface 30 of the substrate 26.

A door panel 48 is pivotally mounted to the front side 38 of the flange portion 42 of the airbag chute 36. The size and shape of the door panel 48 is such that an outer periphery 50 of the door panel 48 substantially aligns with an outer periphery 52 of the flange portion 42 of the airbag chute 36, wherein the door panel 48 completely covers an opening 54 formed within the airbag chute 36. A piece of adhesive tape 56 extends around the outer periphery 50 of the door panel 48 and the outer periphery 52 of the airbag chute 36. The tape 56 is folded over onto a front surface 58 of the door panel 48 and onto the rear side 40 of the airbag chute 36 to secure the door panel 48 in the closed position. The portion of the tape 56 that is folded over onto the rear side 40 of the airbag chute 36 is secured in place by being pinched between the rear side 40 of the airbag chute 36 and the outer surface 28 of the substrate 26. The adhesive tape 56 also serves a second function by providing a sealed engagement between the door panel 48 and the airbag chute 36.

Preferably, the door panel 48 is generally rectangular in shape, and includes a top flap 60 extending therefrom to allow the door panel 48 to be attached to the flange portion 42 the airbag chute 36. The top flap 60 preferably includes apertures 62 for securing the door panel 48 to the airbag chute 36. The top flap 60 is pivotally connected to the door panel 48 to allow the door panel 48 to pivot with relation to the top flap 60 and the airbag chute 36. In this way, the door panel 48 can pivot between a closed position, where the door panel 48 covers the opening 54 within the airbag chute 36, and an open position, where the door panel 48 is pivoted outward away from the airbag chute 36, thereby leaving the opening 54 within the airbag chute un-covered.

The door panel 48 can be attached to the top flap 60 by any pivotal means, however, in the preferred embodiment, the top flap 60 and the door panel 48 are formed from a single piece of stamped metal. The door panel 48 includes ribs 64 formed therein to provide structural strength. When the door panel 48 pivots from the closed position to the open position, the single stamped piece of aluminum bends at a point between the door panel 48 and the top flap 60. The single piece stamping includes a crease line between the door panel 48 and the top flap 60 to provide a pre-determined bend point to allow proper pivotal movement of the door panel 48 in relation to the substrate 26.

Figure 1:
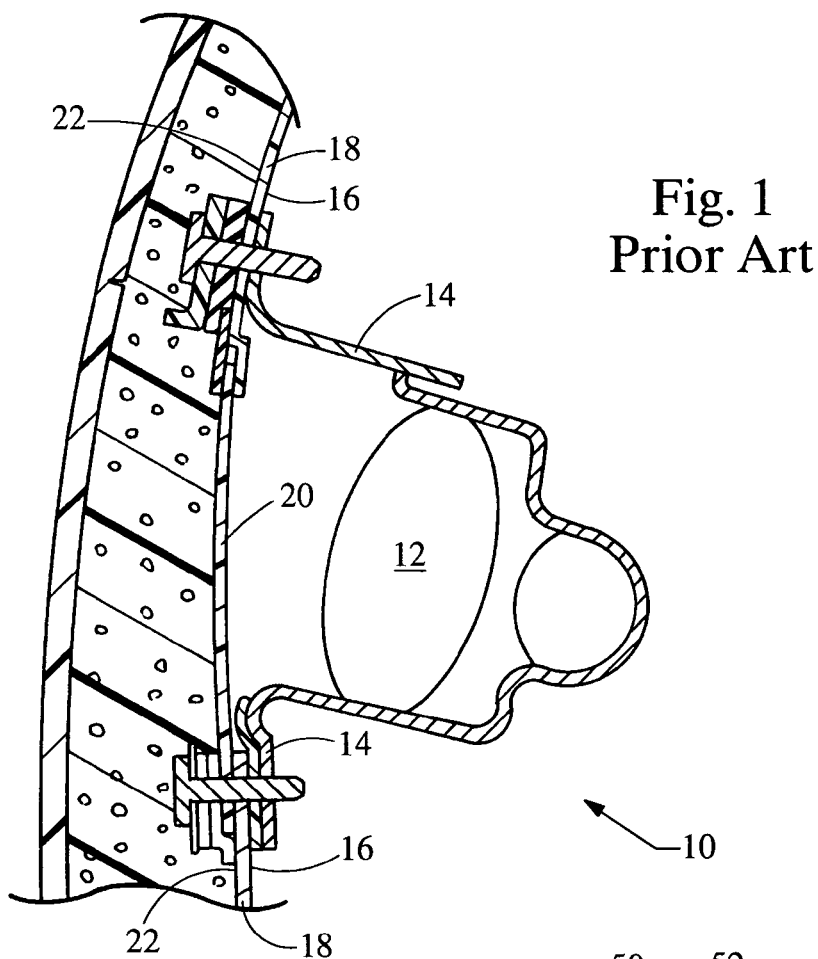
FIG. 1 is a sectional view of a prior art instrument panel having an integrated air bag door assembly.
Figure 3:
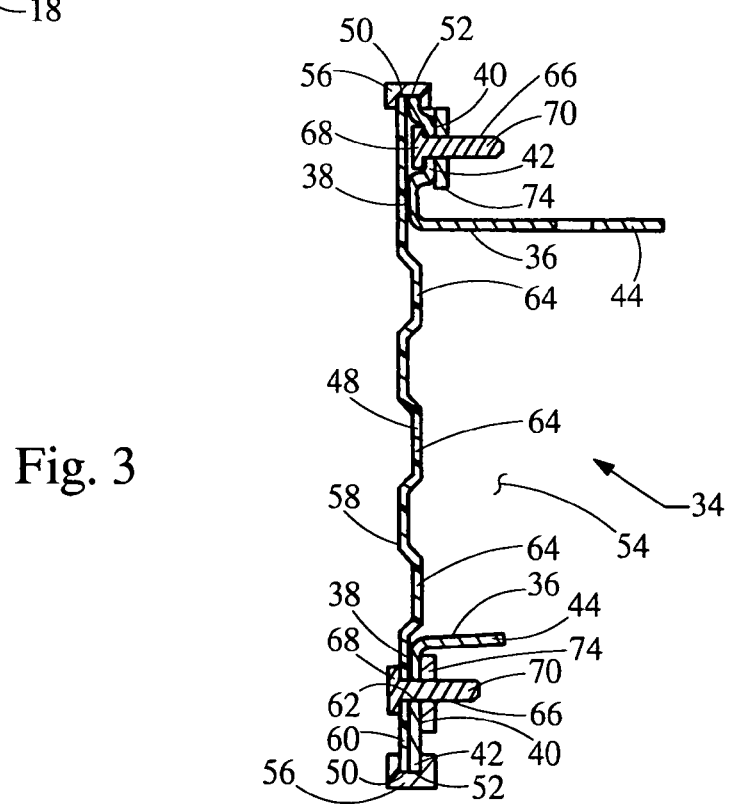
FIG. 3 is a sectional view of the modular air bag door assembly shown in FIG. 2.

Preferably, the modular airbag door assembly 34 is secured to the substrate by a plurality of weld studs 66 extending from the rear side 40 of the airbag chute 36. As shown in FIGS. 2 and 3, along the top flap 60, weld studs extend through the top flap 60, through the flange portion 42 of the airbag chute 36 and through the substrate 26. The weld studs 66 have a head portion 68 that engages the front surface 58 of the top flap 60, and a threaded shaft portion 70 that extends through the substrate 26. A nut 72 or other appropriate device is then attached to the threaded shaft 70 of the weld studs 66 adjacent the inner surface 30 of the substrate 26 to secure the door panel 48 and the airbag chute 36 to the outer surface 28 of the substrate 26.

Similar weld studs 66 extend around the flange portion 42 of the airbag chute 36 under the door panel 48 to secure the airbag chute 36 to the outer surface 28 of the substrate 26. In this instance, the head portion 68 engages the front side 38 of the airbag chute 36 and the threaded shaft portion 70 extends through the flange portion 42 of the airbag chute 36 and through the substrate 26. A nut 72 or other appropriate device is then attached to the threaded shaft 70 of the weld studs 66 adjacent the inner surface 30 of the substrate 26 to secure the airbag chute 36 to the outer surface 28 of the substrate 26.

Preferably, a gasket 74 is positioned between the rear side 40 of the flange portion 42 of the airbag chute 36 and the outer surface 28 of the substrate 26 to provide a seal between the flange portion 42 of the airbag chute 36 and the outer surface 28 of the substrate 26.

An outer skin 76 extends over the entire substrate 26 to conceal the substrate 26 and provide an aesthetically pleasing appearance to the interior of the vehicle. A foam 78 fills in between the outer skin 76 and the substrate 26 to support the outer skin 76 and to provide padding between the outer skin 76 and the substrate 26. The outer skin 76 can be formed from any suitable flexible plastic such as PVC (polyvinyl chloride), thermoplastic urethane, ABS (acrylonitrile-butadiene-styrene), TPO (thermoplastic olefins), ASA (acrylonitrile-styrene-acrylic), or blended elastomeric thermoplastic polymers and polyolefins. The foam 78 can be made from any suitable material such as poly-urethane, PVC, poly-ethylene or poly-propylene. The exact material used for the outer skin 76 and the foam 78 will depend on the functional as well as aesthetic requirements of the particular application.

To prevent the outer skin 76 from hindering the effective opening of the door panel 48, the outer skin 76 preferably includes a pre-weakened seam 80 formed on an inner surface of the outer skin 76 opposite the interior of the vehicle. The seam 80 is formed in a generally U-shape to fall immediately over the door panel 48 such that when the air bag device 46 is deployed, and the door panel 48 is forced open, the outer skin 76 will tear along the seam 80 to allow the door panel 48 to pivot outward through the outer skin 76 to the open position. By forming a pre-weakened seam 80 within the outer skin 76, the tearing of the outer skin 76 is controlled so the outer skin 76 will tear consistently. The pre-weakened seam 80 can be formed in the skin 76 by laser scoring, mechanical scoring, molded in groove or other suitable methods.

The front side 38 of the airbag chute 36 includes an outwardly extending ridge 82 that is formed around portions of the opening 32 within the substrate 26. The ridge 82 tapers to a relatively thin distal end 84, whereby the ridge 82 will act as a tear initiator for the foam 78 when the airbag device 46 is deployed. The presence of the ridge 82 reduces the thickness of the foam 78 at that point, thereby providing a weakened area such that the tearing of the foam 78 is controlled and will tear consistently. Preferably, the ridge 82 is substantially aligned with the pre-weakened seam 80 formed within the outer skin 76.

When the instrument panel 24 is formed, the foam 78 between the substrate 26 and the outer skin 76 is typically injected as a liquid which then dries to a solid foam 78. The tape 56 that seals the door panel 48 to the airbag chute 36 and the gasket 74 between the outer surface 28 of the substrate 26 and the rear side 40 of the airbag chute 36 prevents the liquid foam from leaking into the airbag device 46.

The instrument panel 24 is preferably formed by providing the substrate 26 with the opening 32 formed therein. The modular airbag door assembly 34 is mounted to the outer surface 28 of the substrate 26. The airbag device 46 is mounted to the chute portions 44 of the airbag chute 36 that extend through the opening 32 within the substrate 26, such that the air bag device 46 will expand outward through the opening 54 in the airbag chute 36 when deployed. The door panel 48 is pivotally mounted onto the front side 38 of the airbag chute 36 to provide a cover for the opening 54 that can pivot between an open and closed position.

The outer skin 76 is extended over the substrate 26 and a liquid foam 78 is injected between the outer skin 76 and the substrate 26 to substantially fill the space therein and to provide support for the outer skin 76.

Prior to assembly, the door panel 48 is formed from a sheet of metal, preferably aluminum or some other suitable material, and includes stiffening ribs 64 formed therein. The substrate 26 is formed from a suitable plastic. The outer skin 76 is formed from a suitable material as discussed above, and a pre-weakened seam 80 is formed within the outer skin 76 to provide a controlled fracture point within the outer skin 76.

The use of a modular air bag door assembly 34 allows the door panel 48 and the airbag chute 36 to be constructed in one location and assembled to the substrate 26 of an instrument panel at another location. Referring to FIG. 3, the modular door assembly 34 unit includes the airbag chute 36 and the door panel 48 already attached to one another. The door panel 48 is pivotally mounted to the front side 38 of the flange portion 42 of the airbag chute 36, and adhesive tape 56 extends around the outer periphery 50 of the door panel 48 and the outer periphery 52 of the airbag chute 36 to secure the door panel 48 in the closed position and provide a seal therebetween.

The modular airbag door assembly 34 comes with a plurality of weld studs 66 extending from the rear side 40 of the airbag chute 36. Along the top flap 60, weld studs 66 extend through the top flap 60 and through the airbag chute 36. The weld studs 66 have a head portion 68 that engages the front surface 58 of the door panel 48, and a threaded shaft portion 70 that extends through the airbag chute 36.

Similar weld studs 66 extend around the flange portion 42 of the airbag chute 36 under the door panel 48. In this instance, the head portion 68 engages the front side 38 of the airbag chute 36 and the threaded shaft portion 70 extends through the flange portion 42 of the airbag chute 36.

Preferably, a gasket 74 is mounted onto the rear side 40 of the airbag chute 36. The gasket 74 will provide a sealed engagement between the modular airbag door assembly 34 and a substrate when the modular airbag door assembly 34 is mounted onto a substrate.

The foregoing discussion discloses and describes various aspects of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A modular airbag door assembly for mounting to an instrument panel including a substrate, the modular door assembly comprising:

an airbag chute having a front side and a rear side and defining an opening extending therethrough;

a door panel pivotally mounted to said front side of said airbag chute and covering said opening;

said airbag door assembly further including a plurality of studs extending from said rear side of said airbag chute, said studs adapted to allow said airbag door assembly to be mounted to the substrate with said rear side of said chute being positioned toward a front side of the substrate; and a seal extending around ends of both an outer periphery of said airbag chute and an outer periphery of said door panel to seal said outer periphery of said airbag chute and said outer periphery of said door panel and to secure said door panel in a closed position, wherein a portion of said seal is configured to be secured in position by being pinched between said rear side of said airbag chute and said front side of the substrate.

2. The modular airbag door assembly of claim 1 further including a seal mounted to said rear side of said airbag chute to provide a seal between said rear side of said airbag chute and a front side of a substrate to which the modular airbag door assembly is to be mounted.

3. An instrument panel for an automobile passenger compartment comprising:

a substrate having an outer surface and an inner surface and defining an opening extending therethrough;

a modular airbag door assembly mounted to said outer surface of said substrate, said modular airbag door assembly including an airbag chute having a front side and a rear side and defining an opening extending therethrough and a door panel having a front surface and being pivotally mounted to said front side of said airbag chute and covering said opening mounted to said substrate to secure said airbag door assembly onto said outer surface of said substrate;

an airbag device mounted to said portions of said airbag chute that extend through said opening; and a seal extending around both an outer periphery of said airbag chute and an outer periphery of said door panel to seal said outer periphery of said airbag chute and said outer periphery of said door panel and to secure said door panel in a closed position, wherein said airbag device having means to force open said door panel, wherein a portion of said seal is secured in position by being pinched between said rear side of said airbag chute and said outer surface of said substrate.

4. The instrument panel of claim 3 further including a seal positioned between said outer surface of said substrate and said rear side of said airbag chute.

5. The instrument panel of claim 3 wherein said door panel is formed from metal and said substrate is formed of plastic.

6. The instrument panel of claim 5 wherein said door panel has stiffening ribs formed therein.

7. The instrument panel of claim 3 wherein said door panel includes a top flap portion that is secured to said front side of said airbag chute.

8. The instrument panel of claim 3 further including a skin covering extending over said substrate.

9. The instrument panel of claim 8 wherein said skin covering includes a pre-weakened pattern outlining an outer periphery of said door panel, said pre-weakened pattern providing a break point to allow a controlled portion of said skin covering immediately over said modular airbag door assembly to break away upon deployment of said air bag device, said skin providing no external indicia of the air bag device located beneath.

10. The instrument panel of claim 8 further including foam positioned between said skin covering and said substrate.

11. The instrument panel of claim 10 wherein said substrate includes an outwardly extending ridge formed around portions of said opening within said substrate to provide a tear initiator for said foam during deployment of said airbag device.

* * * * *